(12) United States Patent
Kodama et al.

(10) Patent No.: US 8,099,470 B2
(45) Date of Patent: *Jan. 17, 2012

(54) REMOTE DIRECT MEMORY ACCESS FOR ISCSI

(75) Inventors: Jean Kodama, Cerritos, CA (US);
Michael Morrison, Newport Beach, CA (US)

(73) Assignee: Promise Technology, Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/415,208

(22) Filed: Mar. 31, 2009

(65) Prior Publication Data

US 2009/0248830 A1 Oct. 1, 2009

(51) Int. Cl.
*G06F 15/16* (2006.01)
*G06F 15/173* (2006.01)
*G06F 15/177* (2006.01)

(52) U.S. Cl. .................. 709/212; 709/234; 719/326

(58) Field of Classification Search .......... 709/217–236, 709/212–215; 719/326
See application file for complete search history.

(56) References Cited

U.S. PATENT DOCUMENTS

| | | | |
|---|---|---|---|
| 6,226,680 B1 | 5/2001 | Boucher et al. | |
| 6,247,060 B1 | 6/2001 | Boucher et al. | |
| 6,427,171 B1 | 7/2002 | Craft et al. | |
| 6,427,173 B1 | 7/2002 | Boucher et al. | |
| 6,434,620 B1 | 8/2002 | Boucher et al. | |
| 6,591,302 B2 | 7/2003 | Boucher et al. | |
| 6,658,480 B2 | 12/2003 | Boucher et al. | |
| 6,697,868 B2 | 2/2004 | Craft et al. | |
| 6,845,403 B2 | 1/2005 | Chadalapaka | |
| 6,865,617 B2 | 3/2005 | Zeidner et al. | |
| 7,089,587 B2 | 8/2006 | Allen et al. | |
| 7,185,062 B2 | 2/2007 | Lolayekar et al. | |
| 7,512,663 B1 * | 3/2009 | Kodama et al. | ............... 709/212 |
| 2002/0029281 A1 | 3/2002 | Zeidner et al. | |
| 2003/0084209 A1 | 5/2003 | Chadalapaka | |
| 2003/0093567 A1 | 5/2003 | Lolayekar et al. | |
| 2003/0158906 A1 | 8/2003 | Hayes | |
| 2004/0048369 A1 | 3/2004 | Lu | |
| 2004/0054776 A1 | 3/2004 | Klotz et al. | |
| 2004/0073622 A1 * | 4/2004 | McDaniel et al. | ............ 709/212 |

* cited by examiner

*Primary Examiner* — Haresh N Patel
(74) *Attorney, Agent, or Firm* — Knobbe Martens Olson & Bear LLP

(57) ABSTRACT

A storage networking device provides remote direct memory access to its buffer memory, configured to store storage networking data. The storage networking device may be particularly adapted to transmit and receive iSCSI data, such as iSCSI input/output operations. The storage networking device comprises a controller and a buffer memory. The controller manages the receipt of storage networking data and buffer locational data. The storage networking data advantageously includes at least one command for at least partially controlling a device attached to a storage network. Advantageously, the storage networking data may be transmitted using a protocol adapted for the transmission of storage networking data, such as, for example, the iSCSI protocol. The buffer memory advantageously is configured to at least temporarily store at least part of the storage networking data at a location within the buffer memory that is based at least in part on the locational data.

2 Claims, 12 Drawing Sheets

| Initiator Function | PDU Type | Target Function |
|---|---|---|
| Command request (read) | SCSI Command (READ) →  | |
| | | Prepare Data Transfer ← 622 |
| Receive Data | ← SCSI Data-in | Send Data ← 624 |
| Receive Data | ← SCSI Data-in | Send Data ← 626 |
| Receive Data | ← SCSI Data-in | Send Data ← 628 |
| | ← SCSI Data-in | Send Status and Sense ← 630 |
| Command Complete | | |

620 (Command request row)

FIG. 7

| Initiator Function | PDU Type | Target Function |
|---|---|---|
| Command request (write) | SCSI Command (WRITE)——▶ | Receive command and queue it — 640 |
| | | Process old commands — 642 |
| | ◀—— R2T | Ready for data — 644 |
| Send Data | SCSI Data-out——▶ | Receive Data — 646 |
| | ◀—— R2T | Ready for data — 648 |
| | ◀—— R2T | Ready for data — 650 |
| Send Data | SCSI Data-out——▶ | Receive Data — 652 |
| Send Data | SCSI Data-out——▶ | Receive Data — 654 |
| | ◀——SCSI Response | Send Status and Sense — 656 |
| Command Complete | | |

FIG. 8

R2T PDUs sent to initiator:

| | Target Transfer Tag | offset | length |
|---|---|---|---|
| 1 | 0x0010_0123 | 0x0000_0000 | 0x0000_4000 |
| 2 | 0x0011_0123 | 0x0000_4000 | 0x0000_8000 |
| 3 | 0x0012_0123 | 0x0000_c000 | 0x0000_4000 |

FIG.9B data pointer table

| index | data pointer | data offset | data length |
|---|---|---|---|
| 10 | 0x0005_4000 | 0x0000_0000 | 0x0000_4000 |
| 11 | 0x0006_8000 | 0x0000_4000 | 0x0000_8000 |
| 12 | 0x0008_0000 | 0x0000_c000 | 0x0000_4000 |

FIG. 9C

FIG. 9D data out PDUs received from initiator:

| pdu# | Target Transfer Tag | offset | length |
|---|---|---|---|
| 1 | 0x0010_0123 | 0x0000_0000 | 0x0000_2000 |
| 2 | 0x0010_0123 | 0x0000_2000 | 0x0000_2000 |
| 3 | 0x0011_0123 | 0x0000_4000 | 0x0000_2000 |
| 4 | 0x0011_0123 | 0x0000_6000 | 0x0000_2000 |
| 5 | 0x0011_0123 | 0x0000_8000 | 0x0000_2000 |
| 6 | 0x0011_0123 | 0x0000_a000 | 0x0000_2000 |
| 7 | 0x0012_0123 | 0x0000_c000 | 0x0000_2000 |
| 8 | 0x0012_0123 | 0x0000_e000 | 0x0000_2000 |

REMOTE DIRECT MEMORY ACCESS FOR ISCSI

RELATED APPLICATIONS

This application claims the benefit of U.S. Provisional Patent Application No. 60/469,556, which is entitled "Remote Direct Memory Access" which was filed Feb. 18, 2003. The foregoing provisional patent application is hereby incorporated by reference in its entirety. This application claims the benefit of U.S. patent application Ser. No. 10/781, 341, now U.S. Pat. No. 7,512,663, which is entitled "Systems and Methods of Directly Placing Data in an ISCSI Storage Device" which was filed Feb. 18, 2004.

FIELD OF THE INVENTION

Aspects of the invention relate generally to remote direct memory access for iSCSI.

BACKGROUND

Recently, protocols have been developed for accessing data storage over networks. These protocols form the basis for new classes of network storage solutions wherein data is remotely stored and distributed within both storage area networks (SANs) and across larger public networks including the Internet. The iSCSI transport protocol standard defines one such approach for accessing and transporting data over commonly utilized Internet Protocol (IP) networks. Using the iSCSI command and instruction set, conventional Small Computer Systems Interface (SCSI) commands, typically associated with communication within locally maintained storage devices, may be encapsulated in a network-compatible protocol wrapper allowing SCSI communication between devices in remote manner. The iSCSI protocol may further be used by a host computer system or device to perform block data input/output (I/O) operations with any of a variety of peripheral target devices. Examples of target devices may include data storage devices such as disk, tape, and optical storage devices, as well as, printers, scanners, and other devices that may be networked to one another to exchange information.

In a SAN environment where storage devices are remotely accessible across a network, the block data operations associated with the iSCSI protocol may be structured so as to be compatible with the general manner of processing associated with existing storage devices. For example, disk drives may read and write using a fixed block size (e.g. 512-byte block). In contrast, computer applications may require access to a file of arbitrary length. One function of a computer file system is to change file-oriented requests associated with an application into block-level instructions that may be recognized and processed by the storage devices. Using the iSCSI protocol, such application requests may be processed by the file system to generate storage device compatible instructions thereby permitting storage and retrieval of information.

From an application or software perspective, an iSCSI device generally appears as a locally-attached SCSI device. As with the standard SCSI protocol, iSCSI information exchange is based on communication between an initiator device and a target device (e.g. client/server model). An iSCSI device that requests a connection to the target device and issues an initial series of SCSI commands is referred to as the initiator. An iSCSI device that completes the connection to the initiator and receives the initial SCSI commands is referred to as the target. One function of the initiator is to generate SCSI commands (e.g. data storage and access requests) that are passed through an iSCSI conversion layer where the SCSI commands are encapsulated as iSCSI protocol data units (PDUs). Thereafter, the iSCSI PDUs may be distributed across a network to the target device where the underlying SCSI instructions and data are extracted and processed. In a similar manner, the target device may transmit data and information prepared using the SCSI responses and encapsulated as iSCSI PDUs to be returned to the initiator.

SUMMARY OF THE INVENTION

Embodiments of the invention described herein provide remote direct memory access to buffer memory, located within a storage networking device, for storing storage networking data. Advantageously, providing direct memory access to buffer memory reduces processing resources dedicated to performing input and output operations to buffer memory, thus increasing efficiency of transmissions between storage networking devices. As used herein, storage networking data includes all types of data that can be stored using a storage network, including, for example, commands for controlling storage networking devices. A storage networking device, according to one embodiment, is particularly adapted to transmit and receive iSCSI data, such as iSCSI input/output operations. In one embodiment, the storage networking device is configured to transmit data using other protocols, either in place of iSCSI data or in addition to iSCSI data.

In one embodiment, the storage networking device comprises a controller and a buffer memory. The controller manages the receipt of storage networking data and buffer locational data. According to an embodiment, the storage networking data includes at least one command for at least partially controlling a device attached to a storage network. Advantageously, the storage networking data may be transmitted using a protocol adapted for the transmission of storage networking data, such as, for example, the iSCSI protocol. The buffer memory, in one embodiment, is configured to at least temporarily store at least part of the storage networking data at a location within the buffer memory that is based at least in part on the locational data. Advantageously, this allows the storage networking device to provide direct access to the destination buffer memory without going through intermediate buffering and multiple memory copying.

Advantageously, embodiments described herein can be used either to transmit storage networking data from a initiator device to a target device or to transmit storage networking data from a target device to an initiator device.

In one embodiment, the storage networking device can transmit a pointer to a location in buffer memory within the locational data. This allows the storage networking device to extract the pointer from the locational data in order to determine where within the buffer memory the received storage networking data is to be stored. Alternatively or additionally, the storage networking device can transmit an index to a data pointer table within the locational data. In such an embodiment, the index can be extracted and used to refer to a data pointer table and generate a pointer to a location within the buffer memory. In an embodiment, the index can be encrypted for added security.

In an embodiment, the storage networking device is configured to transmit the information upon which the locational data is based to the remote storage networking device. This embodiment allows the storage networking device to assign a location within buffer memory that is to be used to store received data. In an embodiment, the storage networking data transmits the information upon which the locational data is based to the remote storage networking device in a packet that indicates that the storage networking device is ready to receive data from the remote storage networking device.

Advantageously, the storage networking device can also include a connection lookup table. The connection lookup table, in one embodiment, defines a plurality of connections between the storage networking device and one or more remote storage networking devices. In one embodiment, the locational data, in addition to specifying a location in buffer memory at which storage networking data is to be stored, also identifies one of the connections in the connection lookup table. In an advantageous embodiment, the locational data is used to verify that data received by the storage networking device comes from a recognized connection. This advantageously enhances security of any data transmission to the storage networking device.

Advantageously, each of the foregoing embodiments can also have iSCSI acceleration hardware that accelerates the processing of iSCSI communications received by the storage networking device.

Embodiments of the storage networking device perform the following method of storing data in a directly accessible buffer memory of a storage networking device: (1) storage networking data and first locational data are received over a network from a remote storage networking device. (2) A location within the buffer memory is determined based at least in part on the first locational data. (3) The storage networking data is stored within the buffer memory at the location determined at least in part by the first locational data. In one embodiment, the storage networking data includes at least one command for at least partially controlling a device attached to a storage network and is transmitted using a protocol adapted for the transmission of storage networking data, such as iSCSI. In one embodiment, the first locational data is configured to specify at least indirectly a location within a buffer memory of a storage networking device.

In one embodiment, the storage networking device also transmits second locational data to a remote storage networking device. In one embodiment, the first locational data is substantially the same as the second locational data, such that the storage networking device assigns the location within buffer memory that the storage networking data is stored.

With regard to embodiments of the foregoing method, the location may be determined by generating a pointer into the buffer memory from the first locational data. Generating the pointer may include extracting the pointer from the first locational data, or may include extracting an index into a data pointer table from a part of the first locational data and using the index to extract the pointer from the data pointer table. Advantageously, the part of the first locational data comprising an index may be encrypted within the first locational data.

A skilled artisan will appreciate, in light of this disclosure, that many variations exist of embodiments that are covered by the principles of the invention disclosed herein, many of which are described explicitly herein. Described embodiments are disclosed herein by way of example and not of limitation. A skilled artisan will appreciate, in light of this disclosure, how to practice the invention according to still other embodiments not explicitly described herein. The invention covers all such embodiments.

BRIEF DESCRIPTION OF THE DRAWINGS

These and other features will now be described with reference to the drawings summarized below. These drawings and the associated description are provided to illustrate one or more preferred embodiments of the invention, and not to limit the scope of the invention.

FIG. 7 illustrates an example iSCSI READ sequence.

FIG. 8 illustrates an example iSCSI WRITE sequence.

FIG. 9B illustrates sample R2T PDUs.

FIG. 9C illustrates a data pointer table/

FIG. 9D illustrates sample Data Out PDUs.

DETAILED DESCRIPTION

Figure 1:
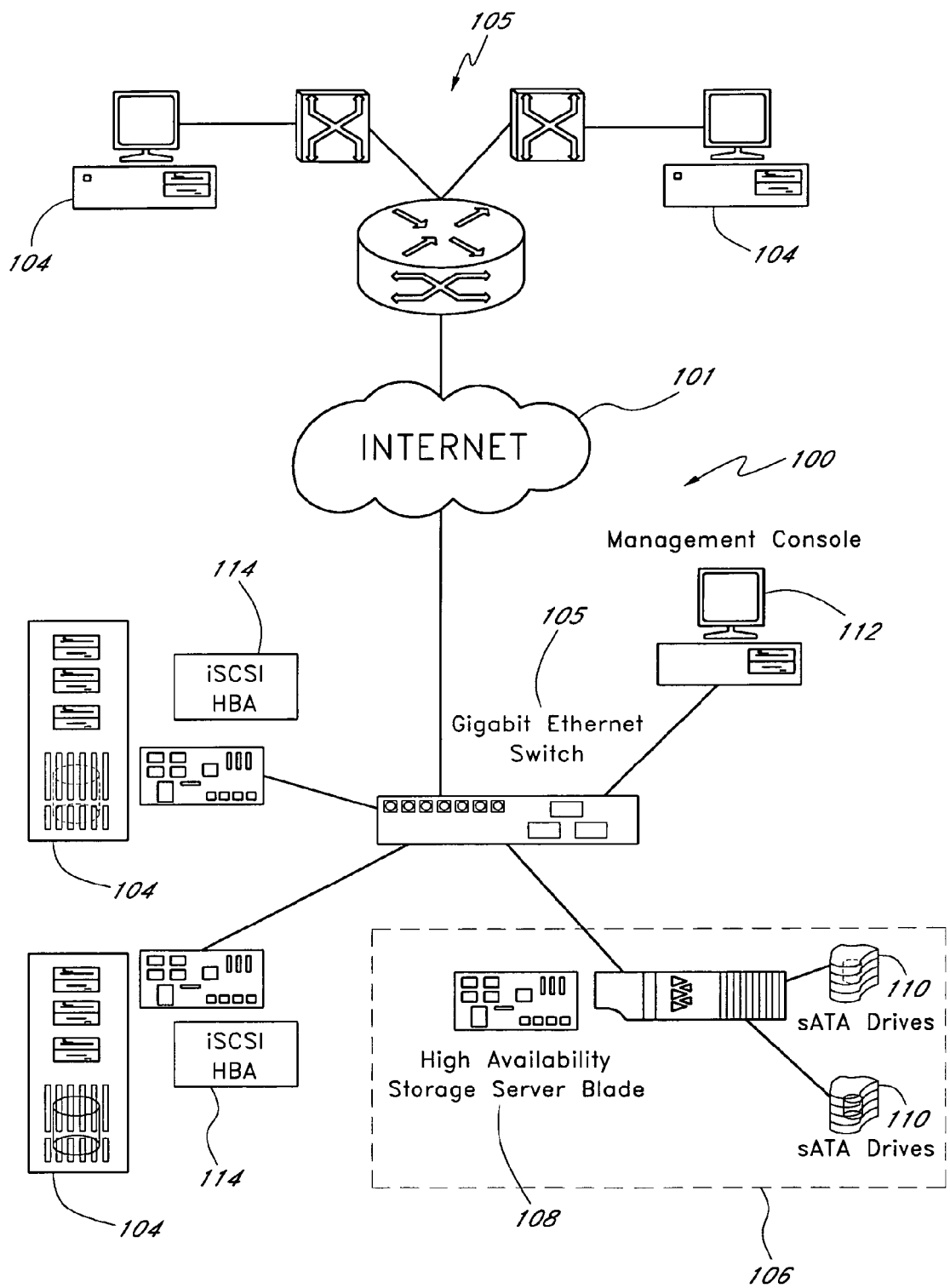
FIG. 1 illustrates an exemplary communications network comprising a plurality of iSCSI-enabled devices.

Although certain preferred embodiments and examples are disclosed below, it will be understood by those of ordinary skill in the art that the invention extends beyond the specifically disclosed embodiments to other alternative embodiments and uses of the invention and obvious modifications and equivalents thereof. Thus, it is intended that the scope of the claimed invention should not be limited by the particular embodiments described below.

The details and specification for the iSCSI protocol standard have been detailed by a working group under the Internet Engineering Task Force (IETF). At the time of this writing, Internet Draft draft-ietf-ips-iscsi-20.txt is the most recent version of the iSCSI protocol, and is hereby incorporated by reference in its entirety. Nothing in this disclosure, including the claims, is intended to limit the invention to any particular implementation of the iSCSI protocol or the TCP/IP protocol, and the terms "iSCSI" and "TCP/IP" as used herein encompass present and future developments to the iSCSI and TCP/IP protocols, respectively.

In one aspect, the present teachings describe a remotely-accessible storage architecture that may be adapted for use with networks which implement packetized information exchange using for example, Transmission Control Protocol/Internet Protocol (TCP/IP) connectivity. The storage architecture comprises an Internet Protocol Storage Area Network (IP-SAN) that may serve as a replacement for Fibre Channel Storage Area Networks (FC-SAN) as well as other convention network attached storage (NAS) and direct storage solutions.

Improvements in transmission efficiency and data throughput compared to many conventional NAS storage environments may be realized using specialized processing of iSCSI commands and information. These iSCSI processing functionalities may be desirably implemented using conventional network infrastructures without significant alterations or upgrades. For example, it is conceived that present teachings may be used in connection with conventional Ethernet configurations wherein routers and switches direct the flow of information throughout the network. One desirable benefit realized when using such an implementation is that a relatively low cost/high performance network storage environment can be created based on an existing network without the need to perform substantial costly network upgrades.

The use of dedicated Fibre channel lines and specialized Fibre channel hardware is also not necessary to gain the benefit of high throughput network storage. It will be appreciated, however, that the systems and methods described herein may be readily adapted for use with numerous different types of networking technologies, including Fibre channel-based technologies, to help improve performance and reliability in network storage and data distribution. It will further be appreciated that the present teachings may be adapted for use in networks containing mixed technologies such as partial Fibre channel/partial conventional Ethernet.

One significant drawback to conventional methods for iSCSI command processing and data encapsulation is that it generally takes place at the software/application level. This presents a problem in that storage servers and their associated storage devices often bear the burden of encapsulation and resolution of SCSI commands. This may place a heavy computational burden upon the file system and CPU of both the initiator and target. In bandwidth intensive applications, where numerous storage requests/accesses are made, target storage devices equipped with such software-limited solutions typically encounter diminished throughput and bottlenecks in data transfer. In one aspect, the present teachings may advantageously be used to overcome the limitations of software/file system iSCSI information processing through the use of iSCSI hardware acceleration devices. As will be described in greater detail herein below, hardware acceleration desirably provides a means to reduce the computational burden of iSCSI packet processing by offloading this task from the file system and CPU onto an iSCSI protocol processing board or storage server blade. Use of the storage server blade may improve performance through dedicated hardware circuitry that is designed to more efficiently handle the tasks associated with iSCSI processing as compared to conventional methods. Furthermore, use of a separate hardware-based processing device removes at least a degree of computational overhead from the file system and CPU to permit other storage-related and unrelated computational tasks to be more efficiently performed.

FIG. 1 illustrates an exemplary communications system for remote information storage and retrieval comprising several iSCSI devices that communicate over a network 100. In the illustrated embodiment, application servers 104 possess suitable network functionality to exchange information with other network devices including switches and routers. In one aspect, the application servers 104 comprise computers or other devices which access informational resources contained within a storage server 106. The storage server 106 comprises a server blade 108 and at least one storage device 110. In one aspect, the server blade 108 comprises a hardware device that provides network connectivity for the at least one storage device 110 and further communicates with the switches and routers used in the network 100.

In various embodiments, the network infrastructure which interconnects the application servers 104 to the server blade 108 comprises gigabit Ethernet connectivity with suitable gigabit Ethernet switches and routers. Although FIG. 1 is illustrated as possessing gigabit Ethernet functionality, it will be appreciated that other network classes such as wide-area networks (WANs), private networks, or the Internet may be serve as a suitable network infrastructure. Likewise the hardware components and devices described in connection with the present teachings may be adapted for use with these and other network configurations including conventional wired networks and optical networks (e.g. Fibre channel).

Each application server 104 uses a host bus adaptor 114 that provides a means for network communication between the application servers 104 and the network 100. Each application server 104 may further be connected directly to the storage server 106 such that no switches or routers are necessary to exchange information in the storage network. Additionally, multiple application servers may communicate with a single storage server, and a single application server may communicate with multiple storage servers. In one embodiment, link aggregation, such as that defined by the I.E.E.E. 802.3ad specification may be used to allow for multiple connections between an application server and a storage server. For a review of link aggregation methodologies and the associated 802.3ad specification the reader is referred to IEEE Std 802.3, 2000 Edition. Section 43 of this standard corresponds to IEEE 802.3ad and is hereby incorporated by reference in its entirety.

Each application server 104 transmits requests for stored resources located on the storage devices 110. As will be described in greater detail herein below, informational requests may take the form of iSCSI PDUs that are sent from the application server 104 to the storage server 106. Furthermore, the HBA 114 of each application server 104 may perform operations associated with forming an appropriate connection to the storage server 106 and encapsulating application server SCSI commands as iSCSI instructions. These iSCSI instructions are received by the server blade 108 wherein they may be decoded and the requested operations associated with the storage devices 110 performed. In a similar manner, the server blade 108 may encapsulate SCSI commands and storage device information as iSCSI instructions to be returned to the application server 104 for processing.

The server blade 108 may also be configured to provide other desirable functionalities such as high availability features which implement backup and failover provisions. In one aspect, the server blade 108 may further serve as a controller for a redundant array of independent disks (RAID) to provide mirroring, redundancy, and backup functionalities through the use of a plurality of storage devices 110 interconnected to the server blade 108. Additionally, two or more server blades may operate in a coordinated manner to provide additional high availability functionalities as well as load balancing and distribution functionalities. Another feature of the server blade 108 is that it may be designed to be compatible with conventional iSCSI HBAs such that existing applications servers 104 which already possess an iSCSI enabled HBA may not require replacement to operate with the storage server 106 of the present teachings.

In various embodiments, a management console 112 may further connect to the network 100. The management console 112 may be associated with an application server 104 or other computer or software-based application that is able to remotely perform administrative functions within the storage server 106 and/or various applications servers 104 located throughout the network 100. In one aspect, the management console 112 may be used to provide software updates and/or firmware revisions to the server blade 108 or storage devices 110 of the storage server 106. Use of the management console 112 also provides a means to remotely view and modify the operational parameters of the storage server 106 in a convenient manner.

Figure 2:
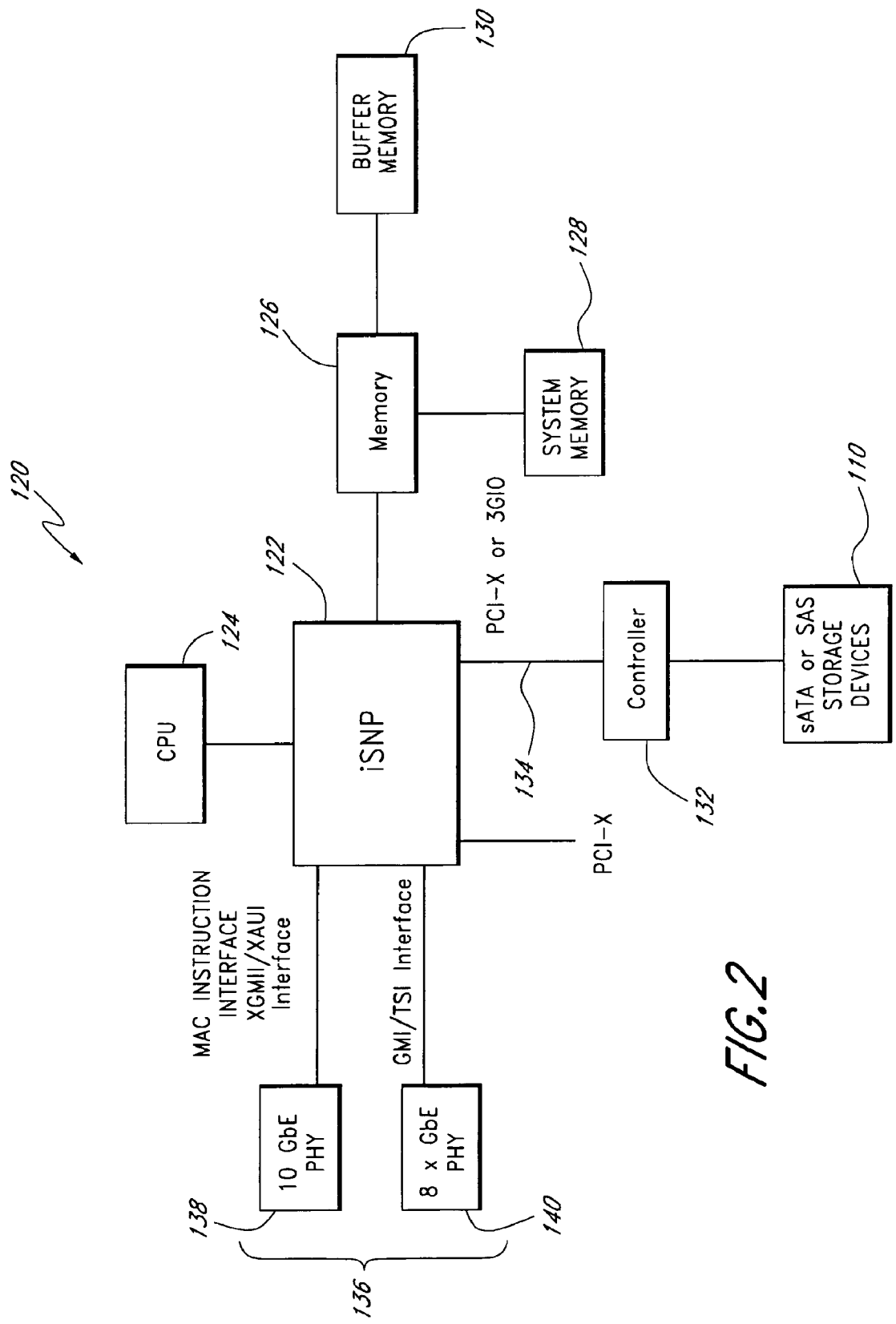
FIG. 2 illustrates a high level block diagram of an iSCSI hardware solution for providing iSCSI processing functionality.

FIG. 2 illustrates a high level block diagram of an iSCSI hardware solution 120 that provides iSCSI processing functionality for the server blade 108 and/or application server HBAs 114. In one aspect, a storage network processor (iSNP) 122 is interconnected with an internal CPU 124. The iSNP 122 and CPU 124 are principally responsible for the processing of iSCSI instructions and data. In one aspect, the iSNP 122 and CPU 124 provide the necessary functionality to encapsulate/decapsulate SCSI instructions and data independent of the rest of the system thereby offloading iSCSI communication overhead.

A memory area 126 is further associated with the iSNP 122 wherein the memory provides buffering functionality for iSNP 122. The memory area 126 may further be subdivided into separate areas including a system memory area 128 and a buffer memory area 130. The system memory 128 may be used to cache iSCSI instructions and commands associated with sending and receiving data throughout the storage network 100. In a similar manner, the data buffer 130 may be used to cache data and information that is transported throughout the storage network 100.

The iSNP 122 is further associated with a storage device controller 132. The storage device controller 132 represents a hardware interface between the server blade 108 and the storage devices 110. The storage device controller 132 may be a conventional controller (e.g. a conventional ATA, serial ATA or SAS controller) or may be a dedicated design that is integrated into the server blade 108. In various embodiments, a compatible bus 134 may provide a means for communication between the iSNP 122 and the storage device controller 132. Furthermore, one or more storage device controllers 132 may be associated with a single iSNP 122 to provide accessibility to multiple storage devices 110 through one or more buses. Each bus 134 may further adhere to a conventionally used communications standard such as a peripheral control interconnect (PCI) bus, a PCI-X bus, or PCI-Express bus.

The iSNP 122 is further associated with a suitable network interface 136 to provide a means for communicating across the network 100. In one aspect, the network interface 136 transmits and receives iSCSI PDUs and acts as an interconnect between the iSNP 122 and other devices present in the network 100. The network interface 136 may comprise a single interface 138 or an aggregated interface 140 which use any of a number of different networking implementations. As will be described in greater detail herein below, the network interface 136 may comprise a XGMII/XAUI interface which allows interconnection between a Media Access Control (MAC) sublayer of the iSNP 122 and a Physical layer (PHY) of the 10 gigabit Ethernet network. Additionally, the network interface 136 may comprise a GMII/MII or TBI/SerDes interface for interconnecting to a 1000 based network, a 100/10 based network or other network type. It will be appreciated that numerous different interface specifications exist for the purpose of providing network connectivity; as such, it is conceived that any of these interfaces may be configured to operate with the iSNP 122 without departing from the scope of the present teachings.

It will be appreciated that the principle components of the iSCSI hardware solution 120 may differ somewhat between that used in the server blade 108 and those used in the application server HBAs 114. For example, the server blade 108 may be configured to accommodate higher bandwidth by providing an increased iSNP 122 processor speed, additional memory 126, multiple controllers 132, and/or higher capacity network interfaces 136. Furthermore, HBA-associated iSCSI hardware solutions may lack certain components that are not required in iSCSI communication such as the controller 132 if no storage devices directly interconnect to the associated device.

Figure 3:
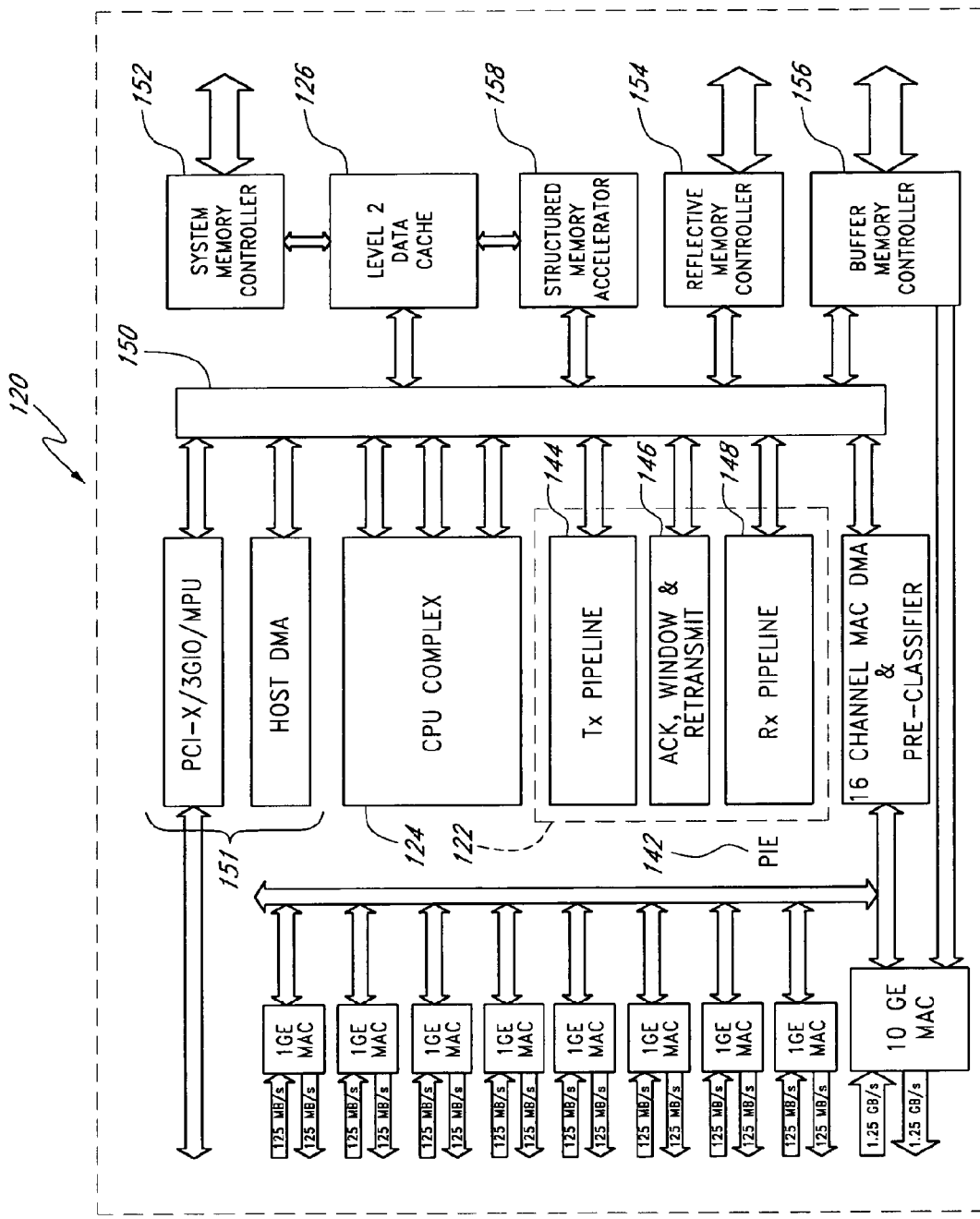
FIG. 3 illustrates another high level block diagram of the iSCSI hardware solution for providing iSCSI processing functionality.

FIG. 3 illustrates another high level block diagram of the iSCSI hardware solution 120 for providing iSCSI processing functionality. In various embodiments, the iSCSI hardware solution 120 is implemented as an application-specific integrated circuit (ASIC) and may support a very long instruction word (VLIW) architecture for one or more of the subcomponents contained therein. In one aspect, the iSNP 122 may be further divided into a series of modules forming a protocol intercept engine (PIE) 142. The PIE subsystem 142 comprises a receive (Rx) module 144, a transmit (Tx) module 146, and an acknowledgment/windowing/and retransmit (AWR) module 148. As will be described in greater detail herein below, the modules of the PIE subsystem 142 are responsible for providing hardware accelerated storage/retrieval functionality and further offload iSCSI protocol processing from the software and/or file system of the storage server 106 and the application servers 104. In one aspect, the PIE subsystem 142 achieves a high level of computational performance through using one or more dedicated processors (e.g. RISC processors) and may further incorporate one or more hard-wired state machines to perform tasks associated with iSCSI instruction and command processing.

The PIE Subsystem 142 communicates with other components of the iSCSI hardware solution 120 through an internal system bus 150. The CPU 124, shown in FIG. 3 as a CPU complex, may be formed as a collection of one or more processors that may be clustered in a hierarchical structure. In one aspect, CPU clustering desirably provides a means to selectively expose certain processors to the system bus 150 and may allow clustered processors to operate in a substantially independent manner thereby improving performance and iSCSI instruction processing capabilities.

A storage controller interface 151 may also be interconnected to the system bus 150 wherein the system controller interface 151 provides a bridge to the storage controller bus 134. In one aspect, the storage controller interface 151 comprises at least one external bus (e.g. PCI, PCI-X, PCI-Express, etc) that interconnects to the controller 132 and optionally a management bus which may serve as an MPU interface.

In various embodiments, two or more iSCSI hardware solutions 120 may be desirably interconnected to provide improved high-availability capabilities, failover, load-balancing, and redundancy features. Furthermore, near zero latency performance can be achieved thereby reducing performance bottlenecks and increasing overall throughput. Interconnection in this manner is accomplished through a coordinated system memory controller 152, reflective memory controller 154, and a buffer memory controller 156 which are linked in a peer to peer manner between each interconnected iSCSI hardware solution 120. Together these components 152, 154, 156 are responsible for communicating and coordinating the activities of each hardware solution 120 with respect to one another. These components also provide advanced error correction and data recovery functionality that aid in improving performance in high-throughput applications.

A structured memory accelerator 158 may also be integrated into the iSCSI hardware solution 120 to provide advanced queuing of instructions and commands. In one aspect, the structured memory accelerator 158 interacts with the buffer memory 126 to improve performance during instruction retrieval by the PIE subsystem 142 and/or the CPU 124. Using the structured memory accelerator 158 further offloads the burden of software command processing by providing an efficient hardware solution for command processing when appropriate. A desirable feature of the structured memory accelerator 158 is that it is capable of handling and managing a large number of queues simultaneously to enhance system performance. This feature further provides the ability to manage a large number of incoming network connections such that incoming requests from many devices may be resolved and serviced without excessive load penalties.

As previously indicated the PIE subsystem 142 provides a number of significant features and functionalities related to the processing of iSCSI PDUs. The iSNP/PIE components process and pass information through a layered storage networking stack wherein one or more of the following functions are performed by the iSNP/PIE components in selected layers. Informational flow throughout the layers may be described in terms of a protocol data unit (PDU) that defines a generic unit of transfer between selected protocol layers. The PDU may contain control information, commands, instructions, as well as data and information relating to the desired send/receive requests.

Some exemplary functions generally associated with the iSNP/PIE components include:

Segmentation and Reassembly: A PDU may be subdivided into smaller PDUs for reasons relating to transfer limitations, improved quality of service, desirable buffer size, or error control functionality. Likewise, segmented PDUs may be assembled into larger PDUs for similar reasons.

Encapsulation: Control information may be included in the PDU that specifies information including, source and destination addresses, status, and/or other options. The control information associated with the PDU may include information associated with different aspects of the protocols in use within the network. For example, a PDU may be simultaneously associated with SCSI control information, iSCSI control information, and other network control information each of which is incorporated into the PDU for subsequent processing during network communication.

Connection control: PDUs may be transferred between devices without prior coordination (e.g. connectionless transfer/broadcast). It is generally desirable however, for devices within the network to establish a logical association or network connection between one another prior to data exchange. In one aspect, establishment of the network communication proceeds according to handshaking or connection rules. Once the connection has been established, data may be transferred between the devices in a coordinated manner. Coordination may take the form of sequentially numbering or organizing PDUs to be transferred to facilitate sequencing of the data providing a means for ordered delivery, flow control, and error recovery.

Flow control: Overflow in the device receiving stored data and information is substantially prevented by sending PDU sequence information describing a selected range of information requested from the sending device. Thereafter, the sending device transmits the PDUs within the selected range and refrains from transmitting PDUs outside of the selected range. Once the receiving device has received all of the PDUs in the selected range, the receiving device then indicates a next range of selected PDUs to be transmitted.

Error control: To recover lost or corrupted PDUs sequence numbers may be used as a reference and positive acknowledgement of valid PDUs may be performed by the receiving device. Furthermore, when a PDU remains unacknowledged for a selected amount of time, the PDU may be retransmitted by the sending device to thereby account for a PDU which may be lost or partially received.

Figure 4:
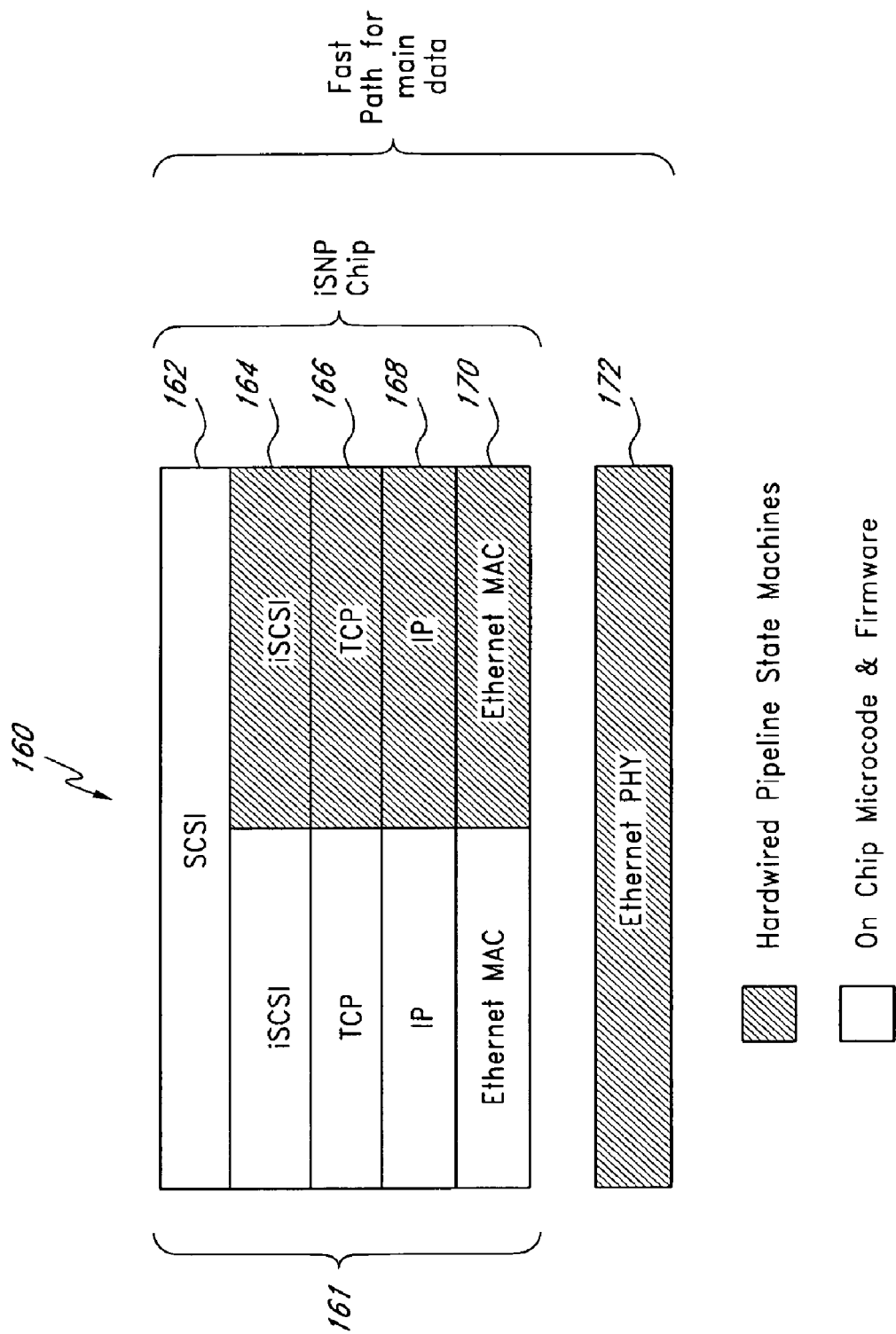
FIG. 4 illustrates a modified iSNP Open System Interconnect (OSI) model for network communications.

FIG. 4 illustrates a modified iSNP Open System Interconnect (OSI) model 160 for network communications wherein the iSNP/PIE components perform operations associated with SCSI, iSCSI, and network command 1 information processing. According to the model 160, storage networking and communication generally follow a layered, or hierarchical approach wherein a plurality of layers exist to perform selected functions related to the processing of information.

The principal layers of the iSNP model 160 include a SCSI layer 162, an iSCSI layer 164, a TCP layer 166, an IP layer 168, an Ethernet layer 170, and a physical layer 172. The SCSI layer 162 implements the SCSI command set wherein storage block data operations (e.g. input/output) to SCSI devices are performed and managed. The iSCSI layer 164 transports SCSI I/O over an IP network through the use of iSCSI protocol data units. Within the iSCSI layer 164, storage device write commands are processed and made ready for transmission.

The TCP layer 166 serves as the principal end-to-end network protocol and is typically used for establishing a reliable (connection-oriented) session between the sending and receiving devices. Each of the PDUs to be transmitted may include a TCP segment header that is used to orient and arrange each of the PDUs with respect to one another when received.

The IP layer 168 serves as a connectionless service that is typically used to route data and information between network devices. Each of the PDUs to be transmitted may include a IP packet header that contains the source address, destination address, and ID information. Segmentation of the PDUs may occur at this layer wherein each PDU is broken into a suitable size/number of IP fragments to accommodate a maximum transfer unit (MTU) of the network. On the receiving side, segmented packets may be reassembled at the IP layer 168 prior to passing up to the TCP layer 166.

The Ethernet layer 170 serves as the media access control (MAC) protocol handler to transfer Ethernet frames across the physical link (e.g. physical network connection/layer). In one aspect, each PDU contains a MAC address that serves as a universal vendor-specific address that is pre-assigned for each network device.

The physical layer 172 defines a physical medium (e.g. physical cable or connection type) and provides the electrical and mechanical means to maintain the physical link between systems.

From the perspective of the iSNP 122, SCSI layer 162 and part of iSCSI layer processing 164 generally occur at the software level whereas part of iSCSI layer, TCP layer 166, IP layer 168, and Ethernet layer 170 processing occur using software or hardware acceleration. In one aspect, hardware acceleration desirably improves data transmission performance and provides a means to rapidly transmit storage data and information in a more efficient manner as compared to conventional network storage solutions.

Figure 5:
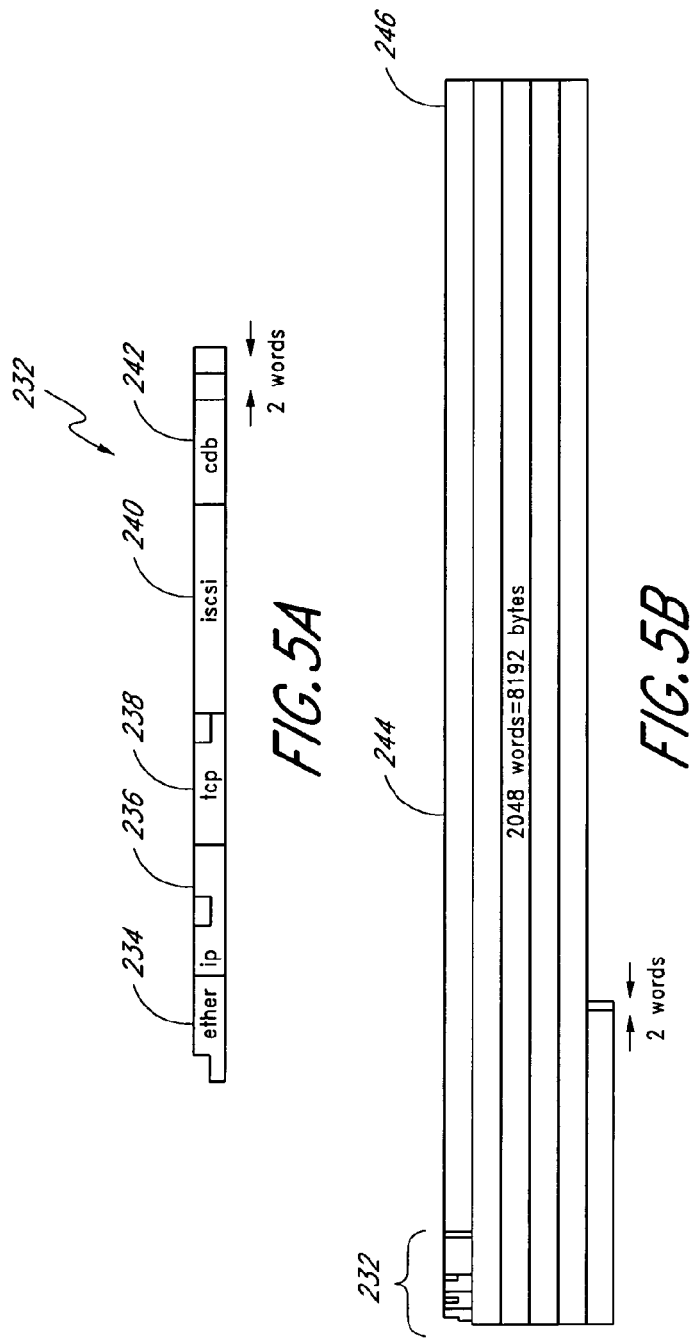
FIG. 5A illustrates an exemplary iSCSI command PDU.
FIG. 5B illustrates an exemplary iSCSI jumbo frame data PDU.
FIG. 5C illustrates an exemplary iSCSI standard frame data PDU.

FIG. 5A illustrates an exemplary iSCSI command PDU segment 232 that incorporates the header information for various layers of the iSNP storage network stack 160. The packet header is organized such that the headers are interpreted according to the order of the stack 160. For example, the iSCSI command PDU segment 232 comprises an Ethernet header 234, an IP header 236, and TCP header 238, and an iSCSI header 240 each of which are arranged substantially adjacent to one another. One or more of the headers 234, 236, 238, 240 may further include checksum or error correction information 582 that may be used to verify the received information during the various stages of decoding and resolution to insure integrity in the transfer of data and command information.

When processing of the iSCSI command PDU segment 232, the Ethernet header 234 is first decoded/interpreted by the Ethernet layer 170 of the receiving device and passes the remaining contents of the PDU to the next higher layer which in the illustrated example is the IP layer 168. Subsequently, the IP header 236 is decoded/interpreted and the remaining contents of the PDU passed to the next higher layer. The above-described manner of processing proceeds sequentially for each header portion continuing through the decoding of the iSCSI header 164. Thereafter, an underlying SCSI command 242 is resolved and may be executed by the receiving device to accomplish tasks associated with storage and retrieval of information.

FIG. 5B illustrates an exemplary iSCSI jumbo frame data PDU 244 containing a data or information segment 246 associated with the aforementioned iSCSI command header information. In one aspect, the data segment 246 is preceded by the iSCSI command PDU segment 232 which carries the necessary information for the data segment 246 to be interpreted by the receiving device. One desirable benefit of the storage network of the present teachings is that relatively large data frames are supported which may be useful in improving data transmission efficiency between devices. Additionally, only a single iSCSI command PDU segment 232 need be associated with the data segment 246 therefore reducing the amount of information which must be transmitted between devices. In the illustrated example, a data segment 246 of 2048 words or 8192 bytes is shown however, it will be appreciated that other data segment sizes can be readily supported.

FIG. 5C illustrates an exemplary iSCSI standard frame data PDU 248 comprising a plurality of sub-segments each of which are associated with an initial iSCSI command PDU segment 232. In the exemplary iSCSI standard frame data PDU 248, each sub-segment comprises separate header information 254 which is transmitted with the sub-segments 252. During the receipt and decoding of the iSCSI standard frame data PDU 248 each of the sub-segments are re-associated to join the information stored therein. The use of separate header information 254 in the aforementioned manner allows smaller frame sizes to be transmitted which may be re-associated and provides a means to recover or retransmit smaller portions of data as compared to the jumbo frame PDU 244.

Remote Direct Memory Access

Figure 6:
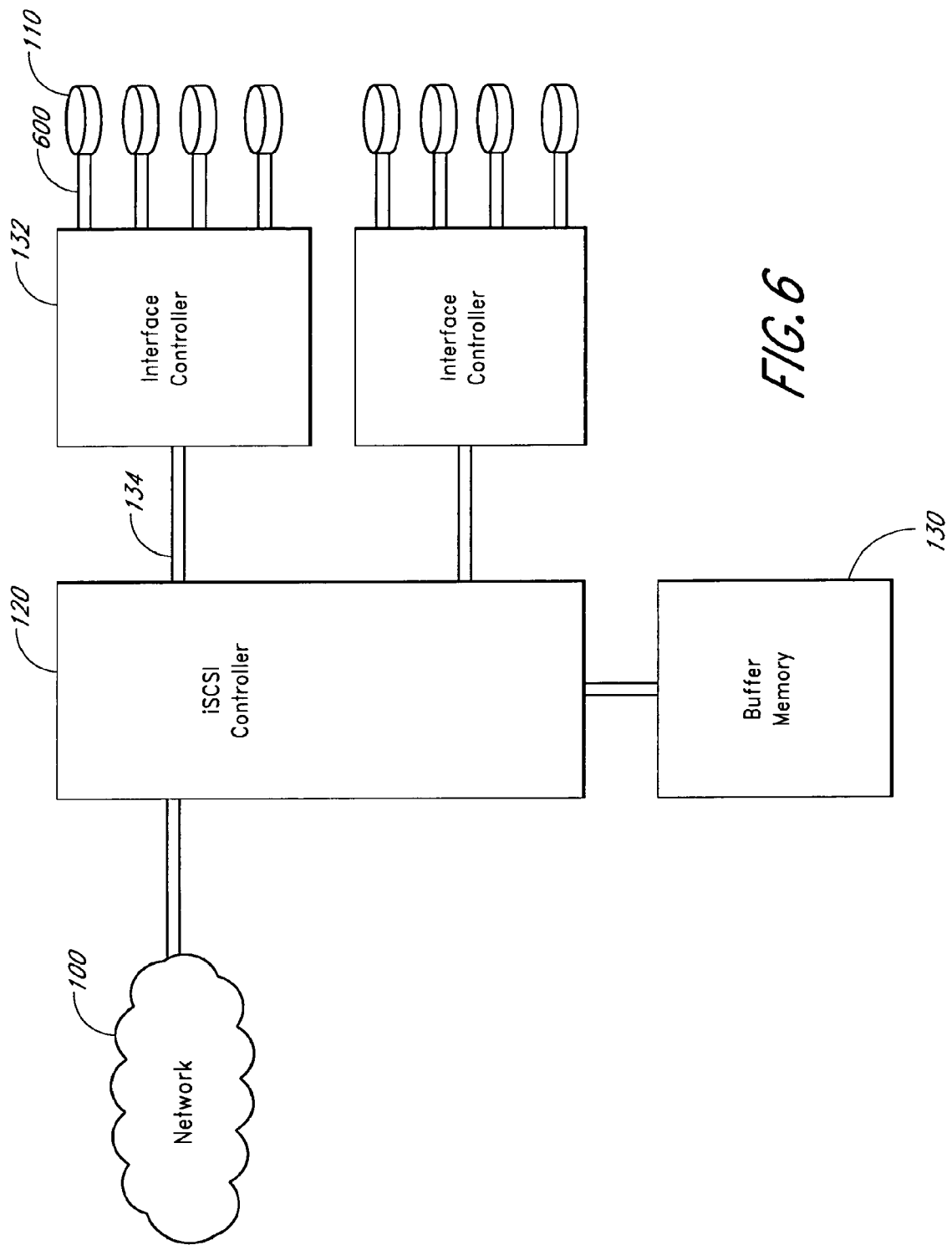
FIG. 6 illustrates a connection between a network and I/O devices.

FIG. 6 illustrates a simplified block diagram for communicating data between a network 100 and storage I/O devices 110. Buffer memory 130 provides an interface between the stream-oriented network 100 and the block-oriented storage I/O devices 110. Data arriving from the network 100 is assembled in buffer memory 130. The storage I/O devices 110 can then access the assembled data as blocks in buffer memory 130. Similarly, the storage I/O devices 110 can transfer blocks of data to buffer memory 130 for transmission over the network 100. The network has direct access to the buffer memory 130 through a buffer memory controller 156 (see FIG. 3) within the iSCSI controller 120. Similarly, the storage I/O devices 110 have direct access to buffer memory 130 using, for example, a PCI-X to Serial ATA Interface 132 and a storage controller interface 151 (see FIG. 3) within the iSCSI controller 120. The specific embodiment illustrated in FIG. 6 is exemplary only, and other types of connections and interfaces may also be appropriate for communicating with the buffer memory 130.

In one embodiment, at least a portion of the data communicated over the network 100 conforms to the iSCSI protocol. Referring to FIG. 6, the iSCSI controller 120 receives iSCSI PDUs from the network 100, and transmits iSCSI PDUs to the network 100. The iSCSI protocol is a mapping of the SCSI remote procedure invocation model over the TCP protocol. At the highest level, SCSI is a family of interfaces for requesting services from I/O devices, such as hard drives, tape drives, CD and DVD drives, printers, and scanners.

A SCSI target device may contain one or more SCSI target ports. iSCSI PDUs that are directed to a specific port need a means to identify that port. This is accomplished in the iSCSI protocol by providing header segments that comprise various control fields. For example, the basic header segment in some PDUs comprises a Logical Unit Number (LUN) field. The LUN field is 64 bits and is formatted in accordance with the SCSI standards.

The basic header segment also comprises an opcode field. The opcode indicates the type of iSCSI PDU corresponding to the basic header segment. The opcodes are divided into two categories: initiator opcodes, which are sent by the initiator, and target opcodes, which are sent by the target. Example initiator opcodes include Login request, SCSI command, SCSI Data-out (for WRITE operations), and Logout request. Example target opcodes include Login response, SCSI response, SCSI Data-in (for READ operations), Ready to Transfer (R2T), and Logout response.

For the particular case when the opcode is a SCSI command, the SCSI command PDU includes a SCSI Command Descriptor Block (CDB). Command Descriptor Blocks contain the command parameters that an initiator sends to a target. The CDB content and structure correspond to the SCSI standard. For example, the initiator could request that the target transfer data to the initiator by sending a SCSI command PDU with a CDB that corresponds to SCSI READ command.

FIG. 7 illustrates an example of the use of the iSCSI protocol to perform a READ operation. As shown at step 620, the initiator communicates a "READ" SCSI command PDU to the target. The "READ" command PDU comprises fields that contain the following information:

LUN—The logical unit number of the SCSI device to read from;

Expected Data Transfer Length—The number of bytes of data the target is expected to transfer to the initiator; and SCSI Command Descriptor Block (CDB)—In this example, the CDB corresponds to the SCSI command descriptor block for the READ command.

A SCSI CDB typically comprises an Operation Code field, a SCSI Logical Unit Number field, and a Logical Block Address field. The CDB may additionally comprise a Transfer Length field, a Parameter List Length field, and an Allocation Length field. The SCSI CDB for the READ command requests that the target transfer data to the initiator. Within the READ CDB, the Logical Block Address field specifies the logical block at which the read operation begins. The Transfer Length field specifies the number of contiguous logical blocks of data to be transferred. Using the Logical Block Address field and the Transfer Length field, the target knows where to begin reading data and the size of the data segment to read. At step 622, the target prepares the data for transfer.

The requested data is communicated from the target to the initiator using one or more iSCSI PDUs. As shown at steps 624, 626 and 628, the requested data in the illustrated example is transmitted from the target to the initiator using three iSCSI Data-in PDUs. The SCSI Data-in PDU comprises a Buffer Offset field that contains the offset of the PDU payload data within the complete data transfer. Thus, the starting point of each SCSI Data-in PDU can be determined by adding the Buffer Offset of the SCSI Data-in PDU to the Logical Block Address field of the READ command PDU.

At step 630, the target transmits a SCSI response PDU to indicate that the READ command is complete.

FIG. 8 illustrates an example of the use of the iSCSI protocol to perform a WRITE operation. As shown at step 640, the initiator communicates a "WRITE" SCSI command PDU to the target. The "WRITE" command PDU comprises fields that contain the following information:

LUN—The logical unit number of the SCSI device to write to;

Expected Data Transfer Length—The number of bytes of data the target is expected to transfer to the initiator; and SCSI Command Descriptor Block (CDB)—In this example, the CDB corresponds to the SCSI command descriptor block for the WRITE command.

The SCSI CDB for the WRITE command requests that the target write data transferred by the initiator to the write medium. Within the WRITE CDB, the Logical Block Address field specifies the logical block at which the write operation begins. The Transfer Length field specifies the number of contiguous logical blocks of data to be transferred. Using the Logical Block Address field and the Transfer Length field, the target knows where to write data and the size of the data segment to write. At step 642, the target processes old commands before starting the new WRITE command.

When an initiator has submitted a SCSI Command with data that passes from the initiator to the target (WRITE), the target may specify which blocks of data it is ready to receive. The target may request that the data blocks be delivered in whichever order is convenient for the target at that particular instant. This information is passed from the target to the initiator in the Ready to Transfer (R2T) PDU. This transmission is shown at step 644, where the target communicates to the initiator that it is ready to process the first data block corresponding to the WRITE command. The R2T PDU comprises fields that contain the following information:

LUN—The logical unit number of the SCSI device to write to;

Desired Data Transfer Length—The number of bytes of data the target expects to receive from the initiator Buffer Offset—The offset of the requested data relative to the buffer address from the execute command procedure call; and Target Transfer Tag—The target assigns its own tag to each R2T request that it sends to the initiator. This tag can be used by the target to identify the data that the target receives from the initiator. The Target Transfer Tag and LUN are copied in the SCSI Data-Out PDUs and are only used by the target. There is no protocol rule about the Target Transfer Tag except that the value 0xffffffff is reserved.

At step 646, the initiator responds the R2T PDU by sending a SCSI Data-out PDU. The SCSI Data-out PDU comprises a Buffer Offset field that contains the offset of the PDU payload data within the complete data transfer. Thus, the starting point of each SCSI Data-out PDU can be determined by adding the Buffer Offset of the SCSI Data-out PDU to the Logical Block Address field of the WRITE command PDU.

At steps 648 and 650, the target communicates two more R2T PDUs to the initiator. The initiator responds at steps 652 and 654 with two SCSI Data-out PDUs.

At step 656, the target transmits a SCSI response PDU to indicate that the WRITE command is complete.

Figure 9A:
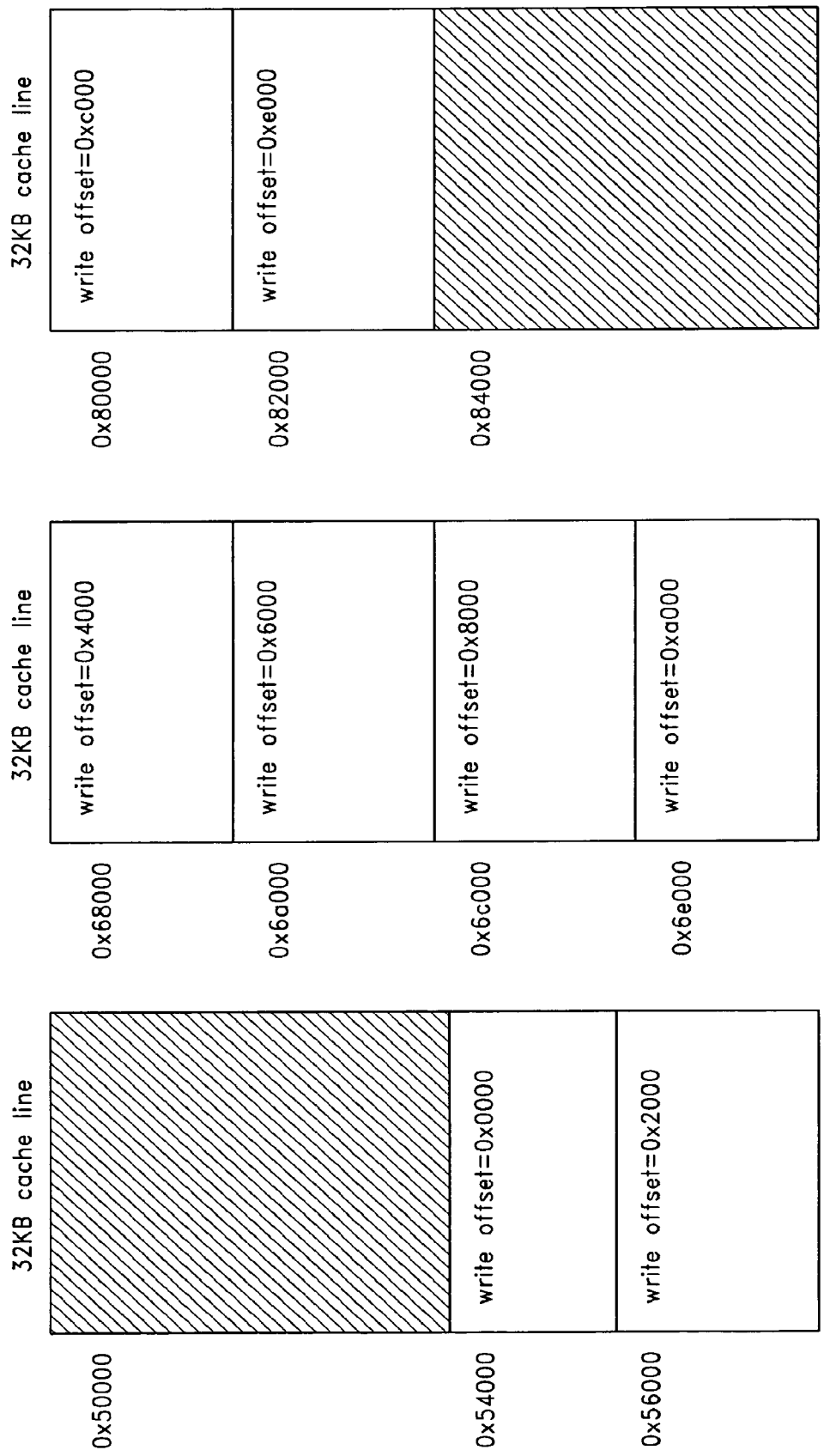
FIG. 9A illustrates three segments of buffer memory.

FIGS. 9A, 9B, 9C, and 9D illustrate a 64 KB Write command example. In this example, the data associated with a write command is temporarily placed in buffer memory 130 before being written to the target device. If there is a contiguous 64 KB block of memory free in the buffer 130, then the entire block of written data may be placed in a single location in the buffer 130. However, there may not be a single contiguous block of memory in the buffer 130 that is large enough to hold all of the data associated with the write command. In the illustrated example, the data associated with a single write command is placed into three different locations in the buffer memory 130. As shown in FIG. 9A, 16 KBytes of data are placed at buffer locations 0x54000-0x57fff, 32 KBytes of data are placed at buffer locations 0x68000-0x6ffff; and 16 KBytes of data are placed at buffer locations 0x80000-0x83fff. These memory locations are represented as the non-hatched portions of the buffer shown in FIG. 9A.

The table shown in FIG. 9B summarizes data for three example R2T PDUs that correspond to the use of the buffer memory identified in FIG. 9A. A target device uses the Desired Data Transfer Length and Buffer Offset fields of an R2T PDU to signify which data the target is ready to receive. The Buffer Offset represents the offset within the complete data transfer. The Desired Data Transfer Length represents the size of the data transfer authorized by a specific R2T PDU. Thus, as illustrated in FIG. 9B, PDU #1 corresponds to a R2T PDU for buffer memory locations 0x54000-0x57fff (0x4000 bytes long with an offset of 0x0000 bytes within the complete data transfer); PDU #2 corresponds to a R2T PDU for buffer memory locations 0x68000-0x6ffff (0x8000 bytes long with an offset of 0x4000 bytes within the complete data transfer); and PDU #3 corresponds to a R2T PDU for buffer memory locations 0x80000-0x83fff (0x4000 bytes long with an offset of 0xc000 bytes within the complete data transfer). One of ordinary skill will also understand that multiple R2T PDUs may be used to place data in a single contiguous block of buffer memory 130, or that an index table may be used to allow a single R2T PDU to correspond to more than one contiguous block of buffer memory 130.

Each R2T PDU includes a Target Transfer Tag (TTT). The target generates a Target Transfer Tag for each R2T PDU that it sends to the initiator. By giving each R2T PDU a unique Target Transfer Tag, the target can determine which incoming data corresponds to each R2T PDU.

The target knows the Logical Block Address field and the Buffer Offset for each SCSI Data-out PDU that the target receives. Thus, the target has sufficient information to perform a WRITE command without using the Target Transfer Tag other than for identification purposes.

In addition to providing identification, the Target Transfer Tag may also be advantageously configured to assist in efficient processing of a Data Out PDU. For example, the Target Transfer Tag may be configured to act as a pointer for providing direct memory access to the buffer 130. In one embodiment, the target configures some or all of the bits in the Target Transfer Tag to be a direct pointer into the buffer 130. When the target receives a corresponding Data Out PDU, the Target Transfer Tag provides a pointer for placing the associated data. This method has the advantage of quick address processing, but providing direct access to memory may make it more difficult to prevent security breaches.

Alternatively, some or all of the 32-bits of the Target Transfer Tag may be used as an index to a Data Pointer Table. FIG. 9C shows a Data Pointer Table where the index corresponds to a portion of the Target Transfer Tag from FIG. 9B. In this example, Target Transfer Tag bits 16-31 provide the index into the Data Pointer Table. Thus, a Target Transfer Tag having a value of 0x0010_0123 indicates a Data Pointer Table offset of 0x0010, a Target Transfer Tag having a value of 0x0010_0123 indicates a Data Pointer Table offset of 0x0011, and a Target Transfer Tag having a value of 0x0012_0123 indicates a Data Pointer Table offset of 0x0012.

The Data Pointer Table may include information such as a pointer to an address in buffer memory 130, the Desired Data Transfer Length from the R2T PDU, the Buffer Offset from the R2T PDU, information about the socket ID, or a pointer to the target device.

The Data Pointer Table entries are initialized, for example, when an R2T PDU is sent to the initiator. FIG. 9C shows an exemplary embodiment of a Data Pointer Table. The entries include a pointer to the location in buffer memory 130 that corresponds with the R2T PDU, a field that corresponds to the Desired Data Transfer Length field of the R2T PDU, and a field that corresponds to the Buffer Offset field of the R2T PDU.

The information in the Data Pointer Table allows for calculation of the destination address in buffer memory 130 for data within the Data Out PDU. When a Data Out PDU is received, the offset in the R2T PDU Buffer Offset field is subtracted from the Data Out PDU Buffer Offset and added to the pointer in the Data Pointer Table to come up with the buffer memory address.

The table shown in FIG. 9D summarizes several exemplary Data Out PDUs that correspond to the R2T PDUs described with respect to FIGS. 9A, 9B, and 9C. Data Out PDUs 1 and 2 are transmitted in response to R2T PDU 1; Data Out PDUs 3, 4, 5 and 6 are transmitted in response to R2T PDU 2; and Data Out PDUs 7 and 8 are transmitted in response to R2T PDU 3. As illustrated, the Target Transfer Tag of the Data Out PDUs correspond with their respective R2T PDUs. The Data Out PDU Buffer Offsets correspond with the offset of the PDU payload data within the complete data transfer. The Data Out PDU Data Segment Length is the data payload length of the Data Out PDU. Using this information in combination with the Data Pointer Table allows for direct memory access into the buffer memory 130. Advantageously, the direct memory access reduces the overhead associated with moving data from location to location.

The Target Transfer Tag may also be used to verify that the Data Out PDU is coming from a recognized connection. For example, all or a portion of the Target Transfer Tag may correspond to an iSCSI socket ID. The iSCSI Socket ID may be determined from the iSCSI PDU, for example, by using a content addressable memory (CAM). In one embodiment, the search data for the CAM comprises the 32-bit IP source address, the 32-bit IP destination address, the 16-bit TCP source port, and the 16-bit TCP destination port. This allows for an arbitrary number of TCP destination port matches. The search result is the Socket ID. In another embodiment, the search data for the CAM comprises the 32-bit IP source address, the 32-bit IP destination address, and either the 16-bit TCP source port or the 16-bit TCP destination port. An additional bit is used to indicate target or initiator mode, which controls whether the TCP source port or the TCP destination port is used in the CAM lookup. In the example illustrated in FIG. 9B, bits 15:0 of the Target Transfer Tag correspond to the socket ID.

In a presently preferred embodiment, the iSCSI Socket ID is compared with information extracted from the iSCSI PDU to verify that the iSCSI PDU has permission to access the memory location associated with the pointer in the lookup table. When the resulting Socket ID from the CAM corresponds with the Socket ID in the lookup table, permission is given to access the memory location listed in the lookup table. An additional check may be used to confirm that the memory offset of the iSCSI PDU is within the allowed memory range.

One embodiment uses information stored in the Data Pointer Table to prevent or limit data corruption. For example, the Data Pointer Table offset encoded in the Target Transfer Tag may be compared with the offsets contained in previously transmitted R2T PDUs. If the Data Pointer Table offset is not consistent with an offset from a previously transmitted R2T PDU, the packet may contain corrupt data.

Storing the Desired Data Transfer Length allows the target to check for accesses to memory locations that are outside of the range provided in the R2T PDU. If the Data Out PDU contains data that is directed to a location in buffer memory 130 that exceeds the range authorized by the R2T PDU, the packet may contain corrupt data. It is to be understood that other range checking methods such as providing a lower limit and an upper limit in the lookup table may also be used to prevent accesses to memory locations outside of the range provided in the R2T PDU.

When a packet is suspected to contain corrupt information, the packet can be ignored, or further analysis may be performed to possibly correct the corruption. Corrupt data may indicate a malicious attempt to sabotage data, and further security measures may be taken to limit access.

The specific embodiments described herein are merely illustrative. Although described in terms of certain preferred embodiments, other embodiments that are apparent to those of ordinary skill in the art, including embodiments which do not provide all of the benefits and features set forth herein, are also within the scope of this invention. For example, the foregoing embodiments described herein have focused on providing direct memory access to a buffer memory within a target device. A skilled artisan will appreciate, in light of this disclosure, how to make, use, and practice embodiments of the invention in which direct memory access is provided to a buffer memory within an initiator device. Just as a target device, in one embodiment, transmits a Target Transfer Tag from which a pointer to the target device's buffer memory can be derived, in one embodiment an initiator device can transmit an Initiator Task Tag configured with substantially the same structure and to perform substantially the same function. That is, based on information in the Initiator Task Tag, a target device may have direct access to a location in the buffer memory of the initiator device. Furthermore, it will be readily apparent to a skilled artisan, in light of this disclosure, that an initiator device can be adapted to support all of the structures and features, described herein with reference to target devices, that are configured to allow direct access to a buffer memory, including, for example, a Data Pointer Table, an index into the Data Pointer Table, a connection lookup table, and the like. This disclosure encompasses this and other alternative embodiments that will be appreciated by a skilled artisan in light of this disclosure.

Accordingly, it is to be understood that the patent rights arising hereunder are not to be limited to the specific embodiments or methods described in this specification or illustrated in the drawings, but extend to other arrangements, technology, and methods, now existing or hereinafter arising, which are suitable or sufficient for achieving the purposes and advantages hereof. The claims alone, and no other part of this disclosure, define the scope of the invention.

What is claimed is:

1. A method of storing data in a directly accessible buffer memory of a storage networking device, the method comprising:

receiving storage networking data and first locational data over a network from a remote storage networking device, wherein the storage networking data includes at least one command for at least partially controlling a device attached to a storage network and is transmitted using a protocol adapted for the transmission of storage networking data, and wherein the first locational data is configured to specify at least indirectly a location within a buffer memory of a storage networking device;

determining based at least in part on the first locational data, a location within the buffer memory;

storing within the buffer memory, at the location determined at least in part by the first locational data, the storage networking data; and transmitting second locational data to a remote storage networking device, wherein the first locational data is substantially the same as the second locational data, such that the storage networking device assigns the location within buffer memory that the storage networking data is stored;

wherein determining a location includes generating from the first locational data a pointer into the buffer memory;

wherein generating the pointer includes extracting from a part of the first locational data an index into a data pointer table and using the index to extract the pointer from the data pointer table;

wherein the part of the first locational data comprising an index is encrypted within the first locational data; and wherein the protocol adapted for the transmission of storage networking data comprises iSCSI and wherein receiving the storage networking data and the first locational data includes receiving the storage networking data and the first locational data within a first Protocol Data Unit and transmitting the second locational data includes transmitting the second locational data in a second Protocol Data Unit.

2. The method of claim 1, further comprising comparing a sum of an offset from the first Protocol Data Unit and a data length from the first Protocol Data Unit with a data length from the second Protocol Data Unit.

* * * * *